US009027533B2

(12) United States Patent
Pifher et al.

(10) Patent No.: US 9,027,533 B2
(45) Date of Patent: May 12, 2015

(54) METHOD AND SYSTEM FOR FUEL SYSTEM CONTROL

(75) Inventors: Kenneth L. Pifher, Holly, MI (US); Mark W. Peters, Wolverine Lake, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 273 days.

(21) Appl. No.: 13/559,455

(22) Filed: Jul. 26, 2012

(65) Prior Publication Data

US 2014/0026866 A1  Jan. 30, 2014

(51) Int. Cl.
| F02D 41/00 | (2006.01) |
| F02M 33/02 | (2006.01) |
| B60K 15/01 | (2006.01) |
| B60K 15/035 | (2006.01) |
| B60W 20/00 | (2006.01) |
| F02M 25/08 | (2006.01) |

(52) U.S. Cl.
CPC ........ *F02D 41/0035* (2013.01); *F02D 41/0032* (2013.01); *F02D 41/004* (2013.01); *F02M 33/02* (2013.01); *F02M 25/0836* (2013.01); *B60Y 2200/92* (2013.01); *B60K 15/01* (2013.01); *B60K 15/035* (2013.01); *B60W 20/00* (2013.01)

(58) Field of Classification Search
CPC .............. F02D 41/0032; F02D 41/003; F02D 41/0042; F02D 41/004; F02M 25/08
USPC .............. 123/520, 519, 518, 516, 521, 198 D
See application file for complete search history.

(56) References Cited

U.S. PATENT DOCUMENTS

| 4,203,401 | A | | 5/1980 | Kingsley et al. | |
| 5,261,379 | A | | 11/1993 | Lipinski et al. | |
| 5,460,143 | A | * | 10/1995 | Narita ............................ | 123/520 |
| 5,694,021 | A | | 12/1997 | Morioka et al. | |
| 5,878,725 | A | | 3/1999 | Osterbrink | |
| 5,893,354 | A | | 4/1999 | Detweiler et al. | |
| RE36,600 | E | | 3/2000 | Ito | |
| 6,196,203 | B1 | * | 3/2001 | Grieve et al. ................... | 123/520 |
| 6,223,732 | B1 | | 5/2001 | Isobe et al. | |
| 6,234,153 | B1 | | 5/2001 | DeGroot et al. | |
| 6,499,472 | B2 | | 12/2002 | Weldon et al. | |
| 6,557,534 | B2 | | 5/2003 | Robichaux et al. | |
| 7,594,500 | B2 | | 9/2009 | Rockwell et al. | |
| 7,762,241 | B2 | * | 7/2010 | Childress et al. ............. | 123/520 |
| 7,775,195 | B2 | | 8/2010 | Schondorf et al. | |

OTHER PUBLICATIONS

Ford Motor Company, "2011 MY OBD System Operation, Summary for Gasoline Engines," Revised Apr. 21, 2010, 251 pages.

* cited by examiner

*Primary Examiner* — Mahmoud Gimie
(74) *Attorney, Agent, or Firm* — David Kelley; Alleman Hall McCoy Russell & Tuttle LLP

(57) ABSTRACT

Methods and systems are provided for controlling a fuel system in a hybrid vehicle. Before canister purging is stopped by closing a purge valve, a canister vent valve is closed to hold fuel tank vacuum. Then, during a subsequent canister purge, the purge valve is opened before opening the vent valve, allowing canister purge to initiate under fuel tank vacuum conditions.

20 Claims, 3 Drawing Sheets

METHOD AND SYSTEM FOR FUEL SYSTEM CONTROL

FIELD

The present description relates to systems and methods for maintaining vacuum in the fuel system of a hybrid vehicle.

BACKGROUND AND SUMMARY

Reduced engine operation times in hybrid vehicles enable fuel economy and reduced fuel emissions benefits. However, the shorter engine operation times can lead to insufficient purging of fuel vapors from the vehicle's emission control system as well as insufficient time for completion of a fuel system leak diagnostics operation. To address some of these issues, hybrid vehicles may include a vapor blocking valve (VBV) between a fuel tank and a hydrocarbon canister of the emission system to limit the amount of fuel vapors absorbed in the canister. An opening or closing of the VBV may then be adjusted based on fuel system conditions to enable fuel vapor purging or leak diagnostics.

One example approach for fuel system control is shown by Rockwell et al. in U.S. Pat. No. 7,594,500. Therein, the fuel tank is coupled to a canister via an air control module having a vapor blocking valve, a canister vent valve, and a canister purge valve. During refueling and elevated fuel tank pressure conditions, the vapor blocking valve may be selectively opened to release fuel tank vapors to the canister. During purging conditions, the canister purge valve and canister vent valve are opened to allow the intake manifold vacuum to purge the canister, while the vapor blocking valve remains closed to prevent the flow of fuel vapors from the fuel tank to the engine.

However, the inventors herein have identified potential issues with such systems. As one example, during purging operations, to promote drawing of hydrocarbons from the canister to the engine intake, while also reducing the amount of fuel tank vapors that are drawn into the engine intake, the VBV has to be powered closed and/or a negative pressure has to be maintained in the fuel tank. In particular, each time the engine is turned off (e.g., to operate the vehicle in a battery mode, or for an engine idle-stop), or when purge is periodically turned off during an engine running event, the VBV has to be powered open to allow the fuel tank to vent pressure developed from vapor generation in the tank into the purge canister. Before purge operations can be subsequently resumed, the VBV is powered closed to isolate the fuel tank, forcing fresh air to flow through the canister bed and increasing canister purge. As such, if the VBV were not closed, the purge flow would draw hydrocarbons out of the fuel tank vapor dome through a buffer area of the canister (thereby bypassing the canister carbon bed) until the fuel tank was at a negative pressure where the path of least resistance would be to come via the carbon bed. Due to the shorter purge times available in hybrid vehicles, purge operations tend to be more aggressive with higher purge ramp rates (relative to corresponding non-hybrid vehicles). Drawing vapors directly from the fuel tank during such aggressive purges can cause substantial air/fuel ratio excursions which in turn degrade combustion stability, tailpipe emissions and overall drivability. In some embodiments, the fuel tank pressure may need to be pumped down to negative pressure levels at each purge cycle to enable purging through the canister bed. As such, these additional steps greatly reduce the already limited time available for purging in hybrid vehicles.

In one example, some of the above issues may be at least partly addressed by a method for a fuel system in a hybrid vehicle, comprising purging hydrocarbons from a canister to an engine intake with a vent valve and a purge valve open, and during the purging, selectively closing the vent valve while the purge valve remains open responsive to a fuel tank pressure to maintain vacuum in the fuel tank. In this way, dependence on a vapor blocking valve for managing fuel tank pressures can be reduced.

As an example, a fuel system in a hybrid vehicle may include a fuel tank coupled to an engine intake via a canister and each of a canister vent valve and a canister purge valve. During purging conditions, such as when a canister load is higher than a first threshold, an engine controller may open a purge valve to apply an engine intake vacuum on the canister carbon bed and draw out the stored hydrocarbons. Following opening the purge valve, the vent valve may also be opened to allow fresh air to flow over the canister bed. The vent valve may be kept open until a desired amount of fuel system vacuum (e.g., fuel tank vacuum) is generated. Specifically, the vent valve may be selectively closed during the purging responsive to the fuel tank pressure to generate and hold a fuel tank vacuum. Then, when the canister purging has been completed, the purge valve may be closed. While the vent valve is closed, the fuel tank vacuum can be monitored for fuel system leaks. During a subsequent purging operation, the purge valve may be opened before the vent valve is opened so that purging is initiated under fuel tank negative pressure conditions. The negative fuel tank pressure causes the path of least resistance for the applied vacuum to be via the canister bed, improving purging of canister hydrocarbons and reducing drawing of fuel tank vapors into the engine intake.

In this way, by timing the closing of a vent valve during canister purging based on a fuel tank pressure, a fuel tank and a vapor path leading fuel tank vapors to an engine intake may be sealed without necessitating a vapor blocking valve. By coordinating closing of the vent valve with closing of the purge valve, at least some negative pressure can be maintained in the fuel system, enhancing drawing of hydrocarbons from the canister into the intake and reducing drawing of fuel tank vapors directly into the engine intake. In this way, air/fuel ratio excursions caused by fuel tank vapors entering the intake can be reduced. In addition, purge delays incurred due to tank pressure bleed down and vapor blocking valve operations can be reduced. By performing leak detection routines while the vent valve is closed, the vacuum held in the fuel system can be advantageously used to complete fuel system diagnostics. By improving the completion frequency of both purging and leak detection operations, emissions compliance may be better ensured.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
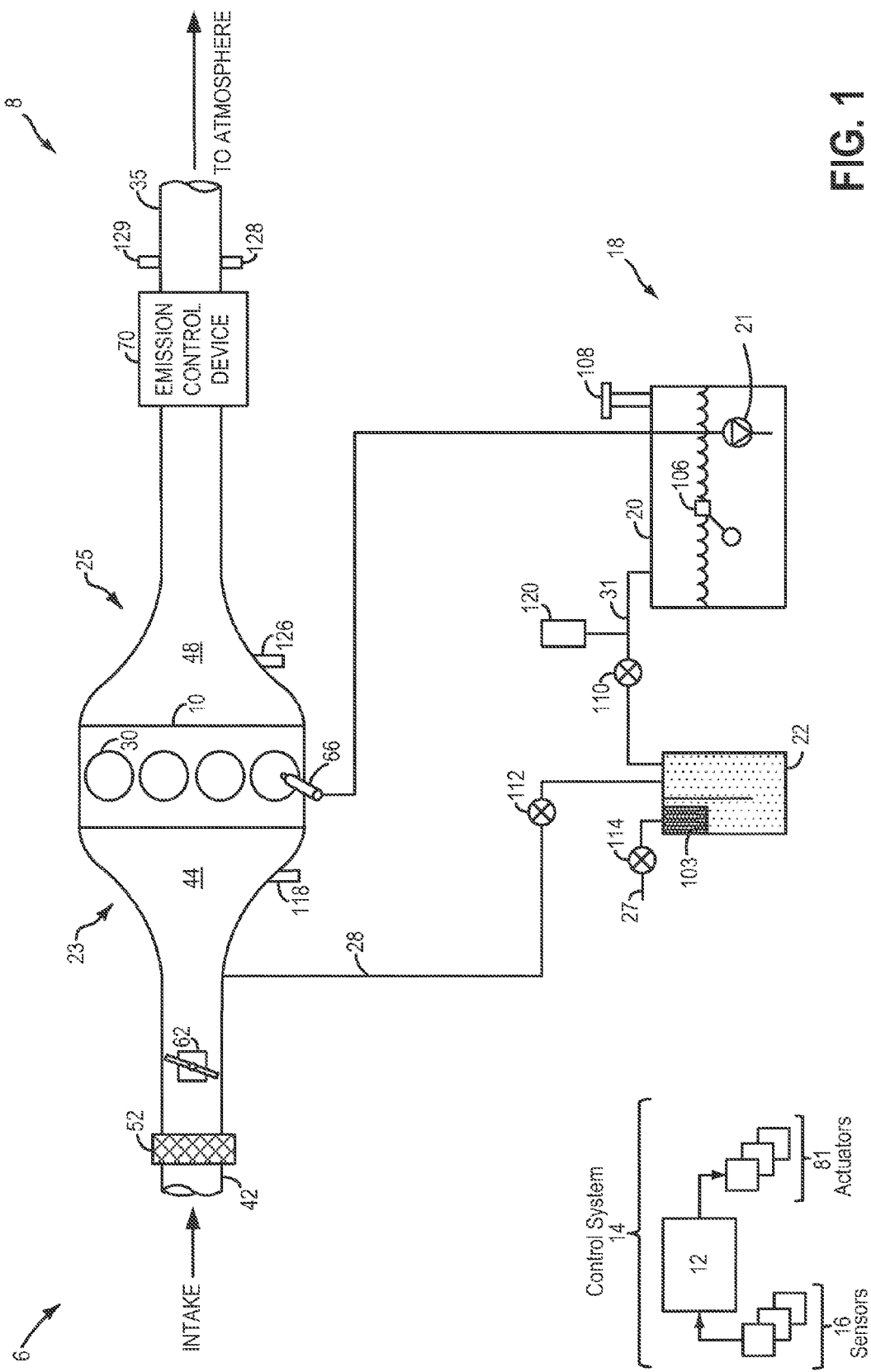
FIG. 1 shows a schematic depiction of an engine and an associated fuel system.

Methods and systems are provided for generating and maintaining at least some negative pressure in a fuel system coupled to a hybrid vehicle, such as the fuel system of FIG. 1. A controller may be configured to perform a control routine, such as the example routine of FIG. 2, to coordinate the closing of a canister vent valve before the closing of a canister purge valve when a purging operation is stopped to hold at least some vacuum in the fuel tank. Then, during a subsequent canister purge, the purge valve can be opened before opening the vent valve, allowing purge to initiate under fuel tank vacuum conditions. The controller may also perform leak detection tests during non-purging conditions while vacuum is held in the fuel system. An example fuel system operation is described at FIG. 3. In this way, purging and leak detection can be better completed during the limited purge time available in hybrid vehicles.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein.

In some embodiments, engine 10 maybe a boosted engine wherein the engine intake includes a boosting device, such as a turbocharger. When included, a turbocharger compressor may be configured to draw in intake air at atmospheric air pressure and boost it to a higher pressure. The turbocharger compressor may be driven by the rotation of an exhaust turbine, coupled to the compressor by a shaft, the turbine spun by the flow of exhaust gases there-through.

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated (e.g., canister load is higher than a threshold), hydrocarbons stored in fuel vapor canister 22 may be purged to engine intake 23 by opening canister purge valve 112 and canister vent valve 114. While a single canister 22 is shown, it will be appreciated that fuel system 18 may include any number of canisters.

Canister 22 may include a buffer 103 (or buffer region), each of the canister and the buffer comprising the adsorbent. As shown, the volume of buffer 103 may be smaller than (e.g., a fraction of) the volume of canister 22. The adsorbent in the buffer 103 may be same as, or different from, the adsorbent in the canister (e.g., both may include charcoal). Buffer 103 may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing any fuel vapor spikes from going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. The vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

Figure 2:
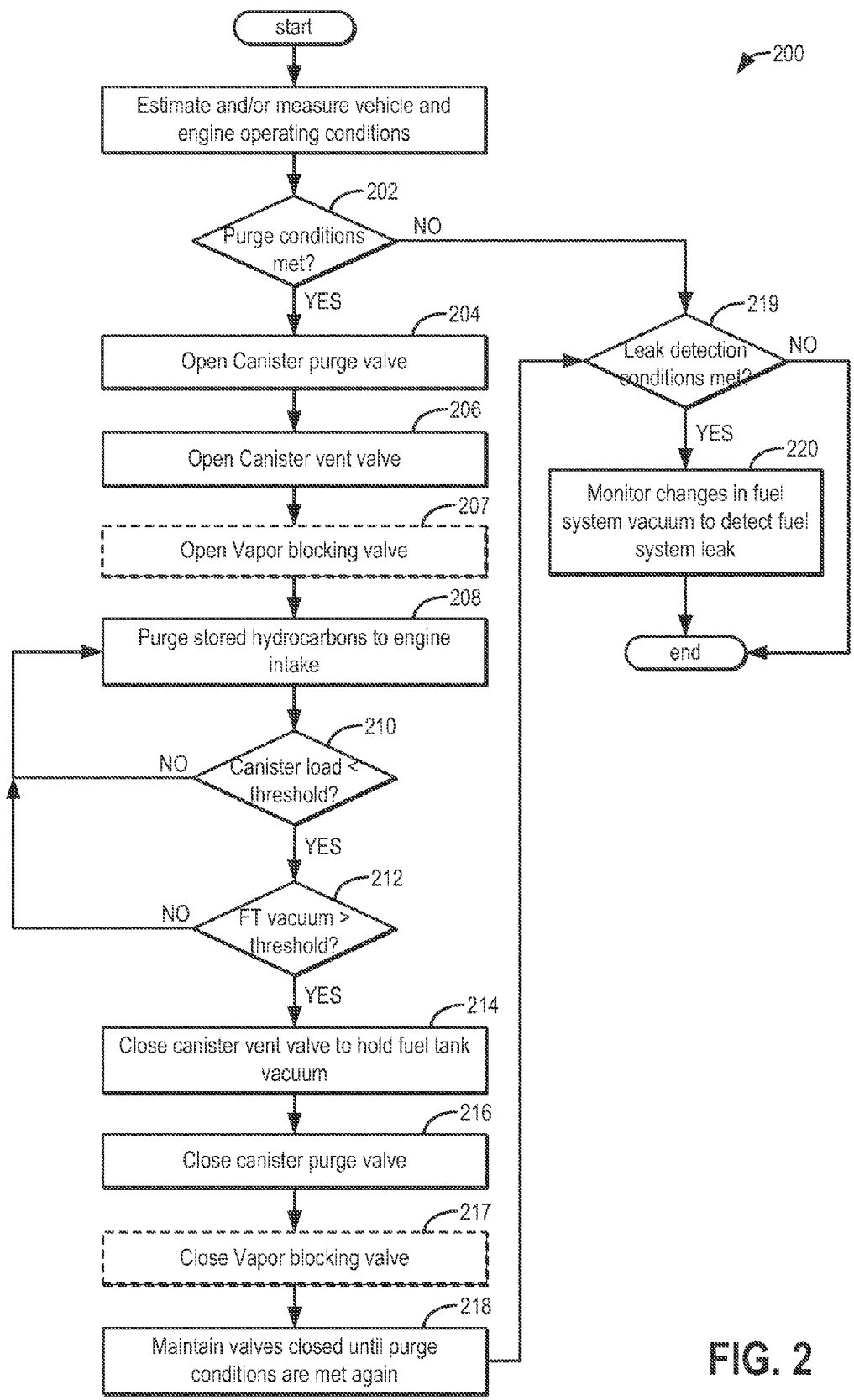
FIG. 2 shows a high level flow chart illustrating a routine for coordinating fuel tank vacuum generation with canister purging operations.
Figure 3:
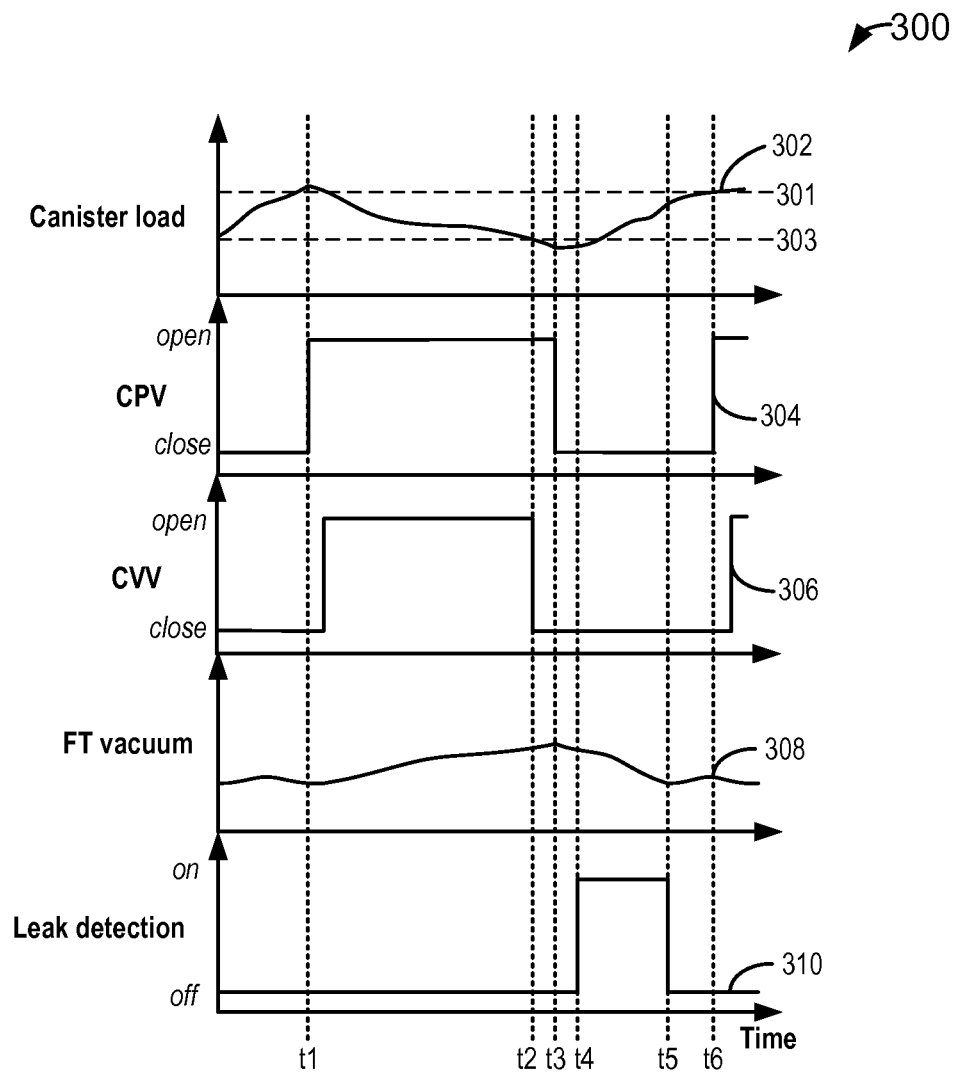
FIG. 3 shows an example fuel system valve adjustment for fuel vapor purging and fuel tank vacuum generation.

As elaborated with reference to FIGS. 2-3, the timing of closing of a canister vent valve and a canister purge valve may be adjusted towards the ending of a purging operation to hold at least some vacuum in the fuel tank. Specifically, the canister vent valve may be closed before the canister purge valve is closed so that fuel system vacuum is maintained in between purge operations. This allows a subsequent canister purge operation to be initiated with the fuel tank under negative pressure, enabling flow through the canister bed to be the path of least resistance. This not only improves the purging of the canister bed but also reduces drawing of fuel tank vapors from the fuel tank vapor dome directly into the engine intake, while bypassing the canister bed.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient or incomplete purging of fuel vapors from the vehicle's emission control system. In some embodiments, to address this issue, an additional vapor blocking valve 110 (or VBV) may be optionally included in conduit 31 between fuel tank 20 and canister 22. In some embodiments, vapor blocking valve 110 may be a solenoid valve wherein operation of the valve is regulated by adjusting a driving signal (or pulse width) of the dedicated solenoid.

During regular engine operation, VBV 110 may be kept closed to limit the amount of diurnal vapors directed to canister 22 from fuel tank 20. During refueling operations, and selected purging conditions, VBV may be opened to direct fuel vapors from the fuel tank 20 to canister 22. By opening the valve during conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows VBV 110 positioned along conduit 31, in alternate embodiments, the isolation valve may be mounted on fuel tank 20. While the vapor blocking valve is said to open to relieve fuel tank over-pressure (e.g., opened when fuel tank pressure is higher than a threshold pressure and below atmospheric pressure), in still other embodiments, fuel tank 20 may also be constructed of material that is able to structurally withstand high fuel tank pressures, such as fuel tank pressures that are higher than the threshold pressure and below atmospheric pressure.

One or more pressure sensors 120 may be coupled to fuel tank 20 for estimating a fuel tank pressure or vacuum level. While the depicted example shows pressure sensor 120 coupled between the fuel tank and VBV 110 along conduit 31, in alternate embodiments, the pressure sensor may be coupled to fuel tank 20. In still other embodiments, a first pressure sensor may be positioned upstream of the vapor blocking valve, while a second pressure sensor is positioned downstream of the vapor blocking valve, to provide an estimate of a pressure difference across the valve.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake.

An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open vapor blocking valve (VBV) 110 and canister vent valve (CVV) 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open vapor blocking valve 110 and canister vent valve 114, while maintaining canister purge valve 112 closed, to depressurize the fuel tank before allowing enabling fuel to be added therein. As such, vapor blocking valve 110 may be kept open during the refueling operation to allow refueling vapors to be stored in the canister. After refueling is completed, the vapor blocking valve and the canister vent valve may be closed.

As yet another example, the fuel system may be operated in a canister purging mode (e.g., after an emission control device light-off temperature has been attained and with the engine running), wherein the controller 12 may open canister purge valve 112 and canister vent valve 114 sequentially, with the canister purge valve opened before the canister vent valve is opened. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister (herein also referred to as the canister load) is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Purging may be performed with vapor blocking valve 110 open as long as there is negative pressure in fuel tank 20. As such, in the absence of a fuel tank vacuum, if vapor blocking valve 110 is kept open during the purging, fuel tank vapors may be drawn into the engine while bypassing the canister carbon bed (e.g., via the canister buffer instead of the carbon bed), leading to engine air/fuel ratio excursions as well as incomplete canister purging. To maintain and hold at least some fuel system vacuum, once the canister is sufficiently purged, and before purging is triggered to stop, the canister vent valve and the canister purge valve may be sequentially closed with the canister vent valve closed before the canister purge valve. By timing the closing of the canister vent valve to be before the closing of the canister purge valve, at least some of the intake manifold vacuum applied on the canister is held in the fuel tank. Consequently, during a subsequent purge routine, when the canister purge valve is opened before the canister vent valve, canister purging can be initiated with the vapor blocking valve open and with negative pressure in the fuel tank.

It will be appreciated that during other purge conditions, such as when sufficient fuel tank vacuum is not available, canister purging may be performed with vapor blocking valve 110 closed to maintain the fuel tank isolated from the engine intake manifold vacuum.

Controller 12 may also be configured to intermittently perform leak detection routines on fuel system 18 to confirm that the fuel system is not degraded. As such, leak detection routines (shown in FIG. 2) may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then seal the fuel system while monitoring a change in fuel tank pressure (e.g., a rate of change in the vacuum level, or a final pressure value).

In one example, to perform the leak test, negative pressure generated at engine intake 23 is applied on the fuel system until a threshold level is reached. Then, the fuel system is isolated from the engine intake and a rate of vacuum bleed-up is monitored. Based on the rate of change in fuel system vacuum, a fuel system leak can be identified. In another example, where at least some negative pressure is held in the fuel system (such as at the fuel tank) before purging is stopped (via timed closing of the canister vent valve), the fuel system vacuum may be advantageously used during non-purging conditions to identify a fuel system leak. Specifically, the fuel tank vacuum/pressure may be monitored during the non-purging conditions and a leak may be determined based on the rate at which the fuel tank pressure bleeds up from the vacuum conditions to barometric pressure. In one example, a fuel system leak may be determined based on the rate of change in fuel tank pressure being larger than a threshold rate. Herein, by using the existing fuel tank vacuum to assess for leaks during non-purging conditions, the need for an auxiliary or dedicated vacuum source for performing leak detection routines is decreased. In addition, by performing the leak detection using the existing fuel system vacuum during non-purging conditions, completion of the leak detection routine in the limited engine running time available on hybrid vehicles may be better enabled.

When included, vapor blocking valve 110 may be maintained closed during the leak detection routine to allow the negative pressure of the fuel system to be monitored. However, in embodiments where an alternate source of negative pressure is used to perform the leak detection, the vapor blocking valve may be opened to allow the corresponding negative or positive pressure to be applied on the fuel tank.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include fuel injector 66, vapor blocking valve 110, purge valve 112, vent valve 114, and throttle 62. The control system 14 may include a controller 12. The controller may receive input data from the various sensors, process the input data, and trigger the actuators in response to the processed input data based on instruction or code programmed therein corresponding to one or more routines. An example control routine is described herein with regard to FIG. 2.

In this way, the system of FIG. 1 enables a method for a fuel system in a hybrid vehicle, wherein hydrocarbons are purged hydrocarbons from a canister to an engine intake with a vent valve and a purge valve open, and during the purging, the vent valve is selectively closed while the purge valve remains open responsive to a fuel tank pressure to maintain vacuum in the fuel tank.

Now turning to FIG. 2, an example routine 200 is shown coordinating the opening and closing of a canister vent valve and canister purge valve at the onset and end of purging operations so as to hold at least some vacuum in a fuel tank coupled to a vehicle fuel system. In the depicted example, the vehicle is a hybrid electric vehicle. By maintaining negative pressure at the fuel tank, a purge flow through the canister bed is enhanced and canister purging is improved.

At 201, vehicle and engine operating conditions may be estimated and/or measured. These may include, for example, engine speed, engine load, ambient conditions (e.g., ambient temperature and humidity), barometric pressure, battery state of charge, canister conditions, fuel level, etc. At 202, it may be determined whether purge conditions have been met. In one example, purge conditions may be considered met when the canister load (estimated or inferred) is higher than a threshold. The canister load may be estimated based on, for example, pressure differences across the canister, an air/fuel ratio estimated downstream of the canister, and/or based on fuel vapor concentrations learned on an immediately previous canister loading and/or purging operation.

In response to purge conditions being met, the routine includes opening a canister purge valve (at 204) followed by opening a vent valve (at 206). Optionally, in embodiments where the fuel system includes a vapor blocking valve coupled between the fuel tank and the canister, at 207, the routine further includes opening the vapor blocking valve responsive to purge valve opening.

Next, at 208, the routine includes purging hydrocarbons from a fuel system canister to an engine intake with the vent valve and the purge valve (and the vapor blocking valve) open. Specifically, by opening the purge valve, an intake manifold vacuum (from the running engine) is applied on the canister bed and hydrocarbons stored in the canister are drawn into, and combusted in, the engine. By opening the canister vent valve, fresh air is concomitantly forced to flow through the canister bed, increasing the efficiency of the canister purge.

At 210, it may be determined if the canister load (estimated or inferred) is lower than the threshold. That is, it may be determined if the canister has been sufficiently purged such that the purging operation can be discontinued. If the canister load is not below the threshold, the routine may return to 208 to continue purging hydrocarbons from the canister. If sufficient canister purging has occurred, then at 212, it may be determined if a fuel tank pressure is less than a threshold pressure. For example, it may be determined if there is negative pressure in the fuel tank, and the fuel tank vacuum level is higher than a threshold amount. If not, the routine may return to purging hydrocarbons from the canister with the vent valve open to continue reducing a pressure in the fuel tank (that is, to provide more fuel tank vacuum).

If the canister load is sufficiently low and there is sufficient fuel tank vacuum, then at 214, the routine includes, during the purging, selectively closing the vent valve while the purge valve remains open responsive to the fuel tank pressure to maintain and hold vacuum in the fuel tank. Herein, selectively closing the vent valve includes fully closing the vent valve responsive to the fuel tank pressure being below the threshold pressure. By closing the vent valve while the purge valve is still open and before purge is triggered to stop, the fuel tank and the vapor path in the fuel system can be sealed and vacuum can be held in the fuel system.

Next, at 216, after closing the vent valve, the purge valve may be closed. By closing the purge valve, the fuel system may be sealed from the engine intake and canister purging operations may stop. Thus, the controller may sequentially close the vent valve followed by the purge valve to stop the purging operation. Optionally, in embodiments where the fuel system includes a vapor blocking valve coupled between the fuel tank and the canister, at 217 the routine further includes closing the vapor blocking valve responsive to vent valve closing.

While the above example suggests closing the purge valve after a duration since the closing of the vent valve, in an alternate example, the controller may close the vent valve responsive to the canister load falling below a first threshold, while maintaining the purge valve open to hold vacuum in the fuel tank. Then, responsive to the canister load falling below a second threshold, lower than the first threshold, the controller may close the purge valve.

The controller may then maintain the vent valve and the purge closed until purge conditions are subsequently met. Specifically, at 218, the routine includes maintaining the vent valve, purge valve, and vapor blocking valve fully closed until the canister load is higher than the threshold (e.g., the first threshold). Then, when the canister load is higher than the threshold load, purge conditions may be reconfirmed and the routine may return to 202 and sequentially open the purge valve followed by the vent valve.

If purge conditions are not met at 202, and/or while maintaining the vent valve closed at 218, the controller may proceed to 219 to determine if leak detection conditions are met. In one example, leak detection conditions may be met if a sufficient amount of time has elapsed since a last leak detection routine. Upon confirming leak detection conditions, while maintaining the valves closed (to hold vacuum in the fuel system), the controller may detect and indicate a fuel system leak based on a change in the fuel tank pressure. Specifically, at 220, the controller may monitor changes in fuel system vacuum to detect a fuel system leak, and determine fuel system degradation based on a rate of change in fuel tank vacuum. For example, the controller may indicate a fuel system leak based on the rate of change in fuel tank pressure (e.g., the rate of bleed-up in fuel tank vacuum to barometric pressure) being faster than a threshold rate. Additionally, the controller may estimate a size of the leak based on the rate of change in fuel tank pressure (e.g., based on the difference between the rate of change in fuel tank pressure and the threshold rate).

In this way, when a fuel system canister is sufficiently purged, and before purge operations are triggered to stop, the closing of a vent valve may be timed to precede the closing of a purge valve so as to generate and hold negative pressure in the fuel tank. By sealing the fuel tank as well as the vapor path leading fuel tank vapors to the engine intake via vent valve closure, the reliance on a vapor blocking valve for isolating the fuel tank is reduced. By performing a leak detection routine using vacuum held in the fuel tank during non-purging conditions, both a leak detection routine and canister purging can be better completed.

Now turning to FIG. 3, an example fuel system adjustment is shown. In particular, map 300 shows how the timing of opening and closing of a canister vent valve can be coordinated with the timing of opening and closing of a canister purge valve during purging operations to hold vacuum in the fuel system. The vacuum held in the fuel system can then be advantageously used during non-purging conditions to monitor for fuel system leaks. Map 300 depicts changes in a canister load at plot 302, canister purge valve (CPV) operations at plot 304, canister vent valve (CVV) operations at plot 306, changes in a fuel tank (FT) vacuum level at plot 308, and leak detection operations at plot 310.

Prior to t1, the engine may be operating in a fuel vapor storing mode (that is, a non-purging condition) with each of the canister vent valve and purge valve closed to store fuel tank vapors. The stored vapors may include, for example, diurnal vapors and fuel tank refueling vapors. At t1, the canister load (plot 302) may be determined to be higher than a first threshold 301. Responsive to canister load being above the first threshold, purge conditions may be confirmed, and while the engine is running, a controller may sequentially open the canister purge valve (CPV, plot 304) followed by the canister vent valve (CVV, plot 306) to purge hydrocarbons stored in the canister to an engine intake. Herein, the engine intake vacuum generated by the spinning engine may be used to draw fuel vapors from the canister into the intake. Due to the presence of at least some fuel tank vacuum at the time purge is initiated (see plot 308), a vapor blocking valve, if included, may be left open during the purging without the intake vacuum drawing fuel tank vapors into the engine intake directly.

Between t1 and t2, canister purging may be continued with the canister vent valve (plot 306) and purge valve (plot 304), as well as a vapor blocking valve, if included, kept open, and a canister load (plot 302) may start to fall. In addition, a fuel tank vacuum level may gradually increase (plot 308). At t2, responsive to canister load falling below the first threshold 301, the controller may close the canister vent valve (plot 306) while maintaining the purge valve open (plot 304) to hold vacuum in the fuel tank (plot 308). However, since the purge valve is open, the canister load may continue to decrease. At t3, responsive to canister load falling below a second threshold 303, the second threshold being lower than the first threshold 301, the controller may close the purge valve (plot 304). In alternate embodiments, the controller may close the purge valve after a predefined duration following the closing of the vent valve. As depicted herein, closing the vent valve includes fully closing the vent valve and closing the purge valve includes fully closing the purge valve.

In embodiments where the fuel system further includes a vapor blocking valve coupled between the fuel tank and the canister, responsive to canister load being above the first threshold, the controller may open the vapor blocking valve after opening the purge valve. In comparison, responsive to canister load falling below the first threshold, the controller may close the vapor blocking valve after closing the vent valve.

After the valves have been closed, the fuel tank vacuum may be held and maintained. The controller may then maintain the purge valve and the vent valve closed until purging conditions are met again at t6. At t6, once purge conditions are met again, the controller may once again sequentially open the purge valve followed by the vent valve to allow purging to initiate with at least some fuel tank vacuum.

Between t3 and t6, while maintaining the purge valve and the vent valve closed, the controller may perform a leak detection routine (plot 310) wherein fuel system degradation is indicated based on a rate of change in the fuel tank vacuum. In the depicted example, the leak detection routine is initiated at t4 and completed at t5. The indication of fuel system degradation may include, for example, indicating fuel system degradation based on a rate of bleed-up in fuel tank vacuum to barometric pressure being faster than a threshold rate. In the depicted example, between t4 and t5, the rate of drop in fuel tank vacuum (determined by the slop of plot 308 between t4 and t5) is determined to be less than a threshold, indicating no fuel system leak or degradation.

In one example, a vehicle fuel system comprises an engine including an intake and a fuel tank coupled to the engine intake via a canister, a vent valve, and a purge valve. A pressure sensor may be coupled to the fuel tank for estimating a fuel tank vacuum. The vehicle system may include a control system or controller with computer readable instructions for, in response to purge conditions being met, opening the purge valve followed by the vent valve to purge canister hydrocarbons to the engine intake while drawing vacuum into the fuel tank, and during the purging, selectively closing the vent valve responsive to fuel tank vacuum being higher than a threshold to hold vacuum in the fuel tank. The controller may further, after selectively closing the vent valve, selectively close the purge valve responsive to a canister load being lower than a threshold. The controller may then maintain the vent valve and the purge valve closed until purge conditions are met again.

While maintaining the vent valve and the purge valve closed, the controller may also monitor a rate of change in fuel tank vacuum. The controller may then indicate fuel system degradation in response to the rate of change in fuel tank vacuum being higher than a threshold rate. In some embodiments, the fuel system further includes a vapor blocking valve coupled between the fuel tank and the canister. In these embodiments, the controller may include further include instructions for, opening the vapor blocking valve after opening the purge valve and the vent valve when purge conditions are met, and closing the vapor blocking valve after closing the purge valve and the vent valve when canister load is lower than the threshold.

In this way, by coordinating the closing of a canister vent valve with the closing of a canister purge valve during termination of canister purging based on a fuel tank pressure, negative pressure may be held in the fuel tank without requiring a dedicated vacuum pump. By sealing the fuel tank and the vapor path leading fuel tank vapors to the engine intake via vent valve closing, the need for a dedicated vapor blocking valve may also be reduced. By maintaining at least some negative pressure in the fuel system at the time of initiation of a canister purging operation, drawing of hydrocarbons from the canister into the intake can be increased while drawing of fuel tank vapors directly into the engine intake is concomitantly decreased. By using the available fuel system vacuum to identify fuel system leaks, a leak detection routine can be performed without requiring a dedicated vacuum source. By reducing purge delays and better enabling canister purging to be completed in the limited engine running available in hybrid vehicles, engine performance and exhaust emission can be improved.

As will be appreciated by one of ordinary skill in the art, routines described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for a fuel system in a vehicle, comprising:
   purging hydrocarbons from a canister to an engine intake with a vent valve and a purge valve open; and
   selectively closing the vent valve while the purge valve remains open and before purge is triggered to stop responsive to fuel tank pressure being lower than a threshold pressure during engine operation.

2. The method of claim 1, wherein selectively closing the vent valve responsive to fuel tank pressure includes fully closing the vent valve responsive to the fuel tank pressure being below the threshold pressure.

3. The method of claim 2, further comprising, maintaining the vent valve closed until purge conditions are met.

4. The method of claim 3, wherein maintaining the vent valve closed until purge conditions are met includes maintaining the vent valve fully closed until a canister load is higher than a threshold load, and then sequentially opening the purge valve followed by the vent valve.

5. The method of claim 4, further comprising, while maintaining the vent valve closed, indicating a fuel system leak based on a change in the fuel tank pressure.

6. The method of claim 5, wherein indicating a leak based on a change in fuel tank pressure includes indicating a leak in the fuel system responsive to the change in fuel tank pressure being faster than a threshold rate.

7. The method of claim 4, wherein the fuel system further includes a vapor blocking valve coupled between the fuel tank and the canister, and wherein the vapor blocking valve is opened responsive to purge valve opening, and closed responsive to vent valve closing.

8. The method of claim 1, wherein the vehicle is a hybrid electric vehicle.

9. A method for a hybrid vehicle fuel system, comprising:
   responsive to canister load being above a first threshold, opening a purge valve followed by a vent valve to purge hydrocarbons stored in a canister to an engine intake; and
   responsive to canister load falling below the first threshold before purge is triggered to stop, closing the vent valve while maintaining the purge valve open to hold vacuum in a fuel tank.

10. The method of claim 9, further comprising, responsive to canister load falling below a second threshold lower than the first threshold, triggering the purge to stop by closing the purge valve.

11. The method of claim 10, wherein closing the vent valve includes fully closing the vent valve and wherein closing the purge valve includes fully closing the purge valve.

12. The method of claim 11, further comprising, maintaining the purge valve and the vent valve closed until purging conditions are met, and then sequentially opening the purge valve followed by the vent valve.

13. The method of claim 12, further comprising, while maintaining the purge valve and the vent valve closed, indicating fuel system degradation based on a rate of change in fuel tank vacuum.

14. The method of claim 13, wherein the indication includes indicating fuel system degradation based on the rate of bleed-up in fuel tank vacuum to barometric pressure being faster than a threshold rate.

15. The method of claim 12, wherein the fuel system further includes a vapor blocking valve coupled between the fuel tank and the canister, further comprising, responsive to canister load being above the first threshold, opening the vapor blocking valve after opening the purge valve, and responsive to canister load falling below the first threshold, closing the vapor blocking valve after closing the vent valve.

16. A vehicle fuel system, comprising:
an engine including an intake;
a fuel tank coupled to the engine intake via a canister, a vent valve, and a purge valve;
a pressure sensor coupled to the fuel tank for estimating a fuel tank vacuum; and
a control system with computer readable instructions for,
in response to purge conditions being met,
opening the purge valve followed by the vent valve to purge canister hydrocarbons to the engine intake while drawing vacuum into the fuel tank; and
during purging,
selectively closing the vent valve responsive to fuel tank vacuum being higher than a threshold to hold vacuum in the fuel tank.

17. The fuel system of claim 16, wherein the control system includes further instructions for, after selectively closing the vent valve, selectively closing the purge valve responsive to a canister load being lower than a threshold.

18. The fuel system of claim 17, wherein the control system includes further instructions for maintaining the vent valve and the purge valve closed until purge conditions are met again.

19. The fuel system of claim 18, wherein the control system includes further instructions for, while maintaining the vent valve and the purge valve closed, monitoring a rate of change in fuel tank vacuum, and indicating fuel system degradation in response to the rate of change in fuel tank vacuum being higher than a threshold rate.

20. The fuel system of claim 18, further comprising a vapor blocking valve coupled between the fuel tank and the canister, wherein the control system includes further instructions for, opening the vapor blocking valve after opening the purge valve and the vent valve when purge conditions are met, and closing the vapor blocking valve after closing the purge valve and the vent valve when canister load is lower than the threshold.

* * * * *